United States Patent [19]
Gurney et al.

[11] Patent Number: 5,619,542
[45] Date of Patent: Apr. 8, 1997

[54] DEVICE AND METHOD FOR EFFICIENT TIMING ESTIMATION IN A DIGITAL RECEIVER

[75] Inventors: David P. Gurney, Algonouin; Kevin L. Baum, Rolling Meadows, both of Ill.

[73] Assignee: Motorola, Inc., Schaumburg, Ill.

[21] Appl. No.: 298,488

[22] Filed: Aug. 30, 1994

[51] Int. Cl.$^6$ ................... H04L 1/02; H04B 7/02
[52] U.S. Cl. ............ 375/371; 375/347; 375/340; 375/355; 370/516
[58] Field of Search .............. 375/340, 257, 375/355, 347, 342, 371; 364/724.1; 455/277.2, 135

[56] References Cited

U.S. PATENT DOCUMENTS 5,073,904  12/1991  Nakamura et al. .
5,329,555  7/1994  Marko et al. .................... 375/347
5,339,452  8/1994  Sugawara ......................... 375/347
5,430,769  7/1995  Patsiokas et al. .............. 375/347
5,481,568  1/1996  Yada ................................. 375/340

*Primary Examiner*—Wellington Chin
*Assistant Examiner*—Jean B. Corrielus
*Attorney, Agent, or Firm*—Darleen J. Stockley

[57] ABSTRACT

The present invention provides for economical predictive symbol timing estimation in a digital receiver by reducing gate count and current drain. The invention also reduces the processing delay. The predictive symbol timing estimation method (300) and device (200) are applicable to any digital radio system which transmits on a continuous or semi-continuous basis.

10 Claims, 4 Drawing Sheets

FIG. 3     300

DEVICE AND METHOD FOR EFFICIENT TIMING ESTIMATION IN A DIGITAL RECEIVER

FIELD OF THE INVENTION

This invention relates generally to block processing in a digital receiver, and more particularly, to timing estimation in a time division multiplexed digital receiver.

BACKGROUND

In a typical digital radio receiver, for symbol timing, timing estimation must be performed on a received signal in order to determine the optimal sampling point to maximize demodulator performance. Symbol timing estimation and recovery is a critical function in any digital radio receiver design. In the prior art, symbol timing estimation typically is performed during a receive slot, thereby requiring buffering of information. This processing requires additional time and complexity to implement.

There is a need for a method and device for predictive symbol timing estimation in a digital radio receiver that does not require buffering, and thus is more efficient.

DETAILED DESCRIPTION OF A PREFERRED EMBODIMENT

The present invention provides a method and device for predictive symbol timing estimation in a digital radio receiver. The method of this invention allows for an economical implementation of symbol timing estimation in a digital radio receiver by reducing gate count and current drain. The method also reduces the processing delay in a digital receiver. The predictive symbol timing estimation method of the present invention may be applied to any digital radio system which transmits on a continuous or semi-continuous basis.

This invention provides a predictive symbol timing estimation method that essentially uses prior information on a radio channel to estimate the symbol timing for the current reception. This method is useful for time division multiplex (TDM) digital radio signals, where the prior symbol timing information is based on the symbol timing derived from the signal transmission intended for other system users in prior time slots. Often, the radio channel characteristics are slowly changing or "quasi-static" over a short period of time, so that symbol timing estimates derived from the signal transmission for other users in prior time slots are equally valid for the received signal in the desired time slot.

Figure 1:
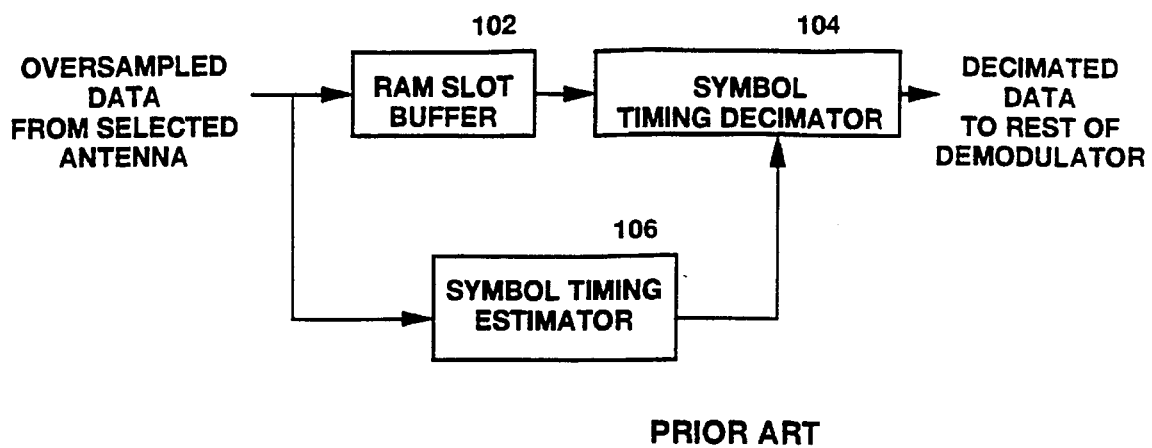
FIG. 1 shows a block diagram of a device for symbol timing estimation in a digital radio receiver as is known in the art.

Typically, a "block processing" approach is taken to demodulating these digital radio signals, wherein each time slot is treated as an individual block of data from which all receive parameters, such as symbol timing, must be estimated. FIG. 1, numeral 100, shows a block diagram of a device for symbol timing estimation in a digital radio receiver as is known in the art. The received signal typically is sampled at a rate which is an integer multiple of the transmitted symbol rate. Thus, a non-integer multiple may also be used. For example, the digital receiver may produce 8 samples over the duration of a symbol. This sample rate is referred to as 8 times oversampling. Typically, the received digital radio signal from a preselected time slot is oversampled and stored in a random access memory (RAM) buffer (102) while receive parameter estimation computations are taking place in a symbol timing estimator (106). The digital received data must be stored in the RAM slot buffer while this computation is taking place, since all subsequent processing, such as detection, relies on the knowledge of the symbol timing. This computation however, often requires most of the time slot to complete. Thus, the digital received data must be stored and recalled later so that it is not lost during the time for computation. The symbol timing estimator computation may take many forms and may be based on any of several timing estimation algorithms known in the art, such as techniques that minimize the received signal's measured or estimated distortion.

Once the symbol timing computation is completed and the symbol timing estimate is available, a symbol timing decimator (104), operably coupled to the RAM slot buffer (102) and to the symbol timing estimator (106), decimates the stored oversampled received data to a predetermined symbol rate at a point based on the estimated symbol timing that has been determined to offer the best reception. The symbol timing decimation point is often estimated as the point in the received symbol stream with the maximum eye opening, or least distortion, which provides the digital detector with the highest possible signal to noise ratio. This decimation point is often called the optimal symbol timing point or optimal sampling phase in the art and can be associated with a corresponding computed distortion measure used to choose it. The decimated digital received data is then typically further processed and detected by the radio receiver.

The main disadvantage of the prior art method is that large amounts of RAM are required to buffer the oversampled digital received data while the symbol timing estimate calculations are taking place. Unfortunately, random access memory is very costly in terms of gate counts, die area, and current drain in application specific integrated circuit (ASIC) design. The digital radio receiver processing delay is also increased due to the RAM buffer delay, which is an undesirable effect in many systems. A portable digital radio receiver must be optimized for all of these critical parameters, i.e. small size, long battery life, cost, in order to allow for an economical implementation.

Figure 2:
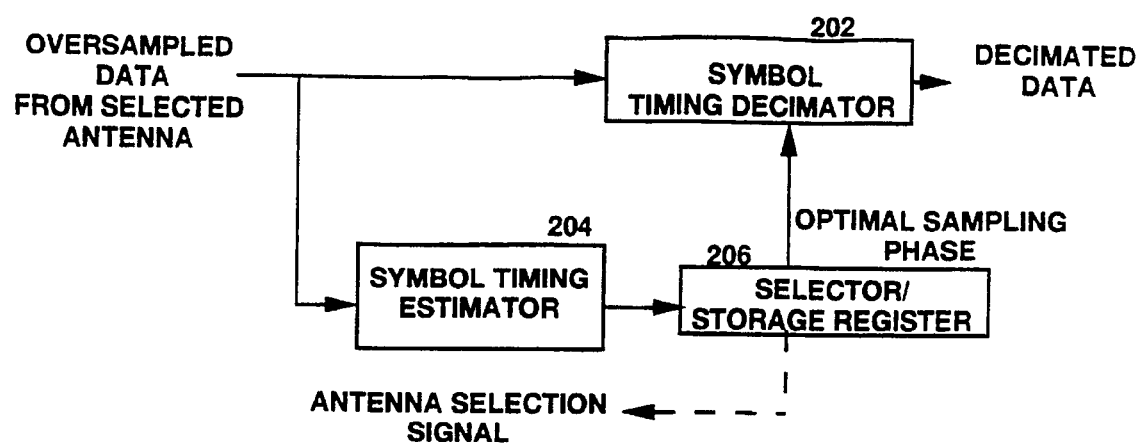
FIG. 2 is a block diagram of a device in accordance with a preferred embodiment of the invention.

A block diagram of a device in accordance with a preferred embodiment of the invention is shown in FIG. 2, numeral 200. The radio in this case may employ antenna selection diversity, in which the antenna with the highest estimated signal to noise ratio is chosen for reception during the desired time slot. The device includes a symbol timing decimator (202), a symbol timing estimator (204), and a selector/storage register (206). The symbol timing decimator (202) is operably coupled to receive oversampled data from selected antenna and an optimal sampling phase from the selector/storage register (206). The symbol timing estimator (204) is operably coupled to receive oversampled data from the selected antenna and is allowed to run in real time on previous information on the radio channel, i.e., prior time slots, in order to calculate a predicted symbol timing estimate or optimal sampling phase for the desired digital received data. By allowing the symbol timing estimator (204) to run prior to the desired reception or time slot, storing the calculated symbol timing estimate value in a storage register, and later applying the predicted symbol timing estimate to the desired digital received data, the entire RAM slot buffer described above can be eliminated. Since the radio channel is slowly changing, the prior symbol timing estimate value is equally valid for the desired time slot. Furthermore, in a digital radio receiver employing two or more antennas, i.e., in a radio receiver utilizing antenna selection diversity, the selector/storage register (206) may be used to store the symbol timing estimate and an associated distortion value for each receiving antenna when a diversity antenna system is employed. The symbol timing estimator (204) computes symbol timing estimates, and associated distortion values are computed from prior information in previous time slots for each antenna, in a manner similar to the single antenna case. The selector/storage register (206), operably coupled to the symbol timing estimator (204), then compares the stored computed distortion values for each antenna in a diversity antenna system and sends an antenna selection signal for selecting the antenna with the minimum distortion value for reception during the desired time slot. This antenna is more favorable in the sense that it will provide the best reception, i.e., least distortion, for a quasi-static channel. The stored symbol timing estimate associated with the more favorable antenna, an optimal sampling phase signal, is chosen and sent to the symbol timing decimator (202) which decimates the oversampled digital received data to a predetermined symbol rate at the optimal sampling point in accordance with the chosen symbol timing estimate. When a single antenna is employed, the selector/storage register (206) operates as a storage register only, which stores the predicted symbol timing estimate derived from a prior time slot, since no antenna selection operation is necessary. The decimated digital received data is then sent to be processed and detected.

It is known to those skilled in the art that there are several valid methods for computing the received symbol timing estimate. In addition, there are several metrics or measures for determining the distortion value, e.g., signal to noise ratio, of a digital received signal which approximate in some way its suitability for reception and detection. Many of these methods may be employed with the present invention, with no loss of generality. Furthermore, it is known to those skilled in the art that more recent symbol timing estimates will typically be more valid or accurate during the desired reception than older symbol timing estimates. The time period that it takes for a predicted timing estimate to be invalid or not useful is determined by the rate of change in the received symbol timing. This change is due to the radio channel characteristics and the inherent drift in the radio receiver's local oscillator. Thus, for best performance, the predicted symbol timing estimate should be as recent as possible, i.e., from time slots immediately preceding the desired time slot.

Figure 3:
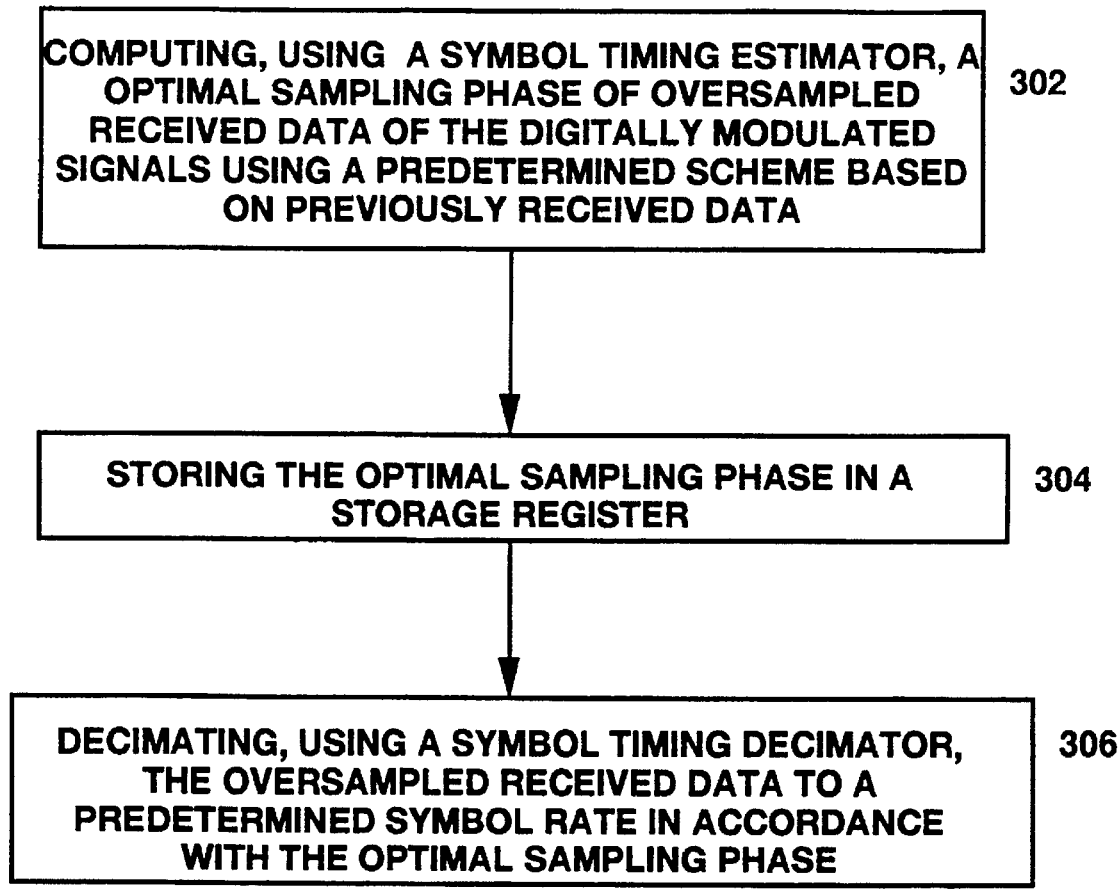
FIG. 3 is a flow chart of the steps for one embodiment of the method of the present invention.

The flow chart of the steps for one embodiment of the method of the present invention are shown in FIG. 3, numeral 300. The method optimizes the implementation of symbol timing estimation in a digital receiver receiving digitally modulated signals and includes the steps of: A) computing, using a symbol timing estimator, an optimal sampling phase of oversampled received data of the digitally modulated signals using a predetermined scheme based on previously received data (302); B) storing the optimal sampling phase in a storage register (304); C) decimating, using a symbol timing decimator, the oversampled received data to a predetermined symbol rate in accordance with the optimal sampling phase (306).

Where selected, the digitally modulated signals may be transmitted in a time division multiplex system. In addition, where selected, the predetermined scheme based on previously received data may include computing the optimal sampling phase as a sampling phase having a least distortion in at least a first preselected portion of previously received oversampled data.

Figure 4:
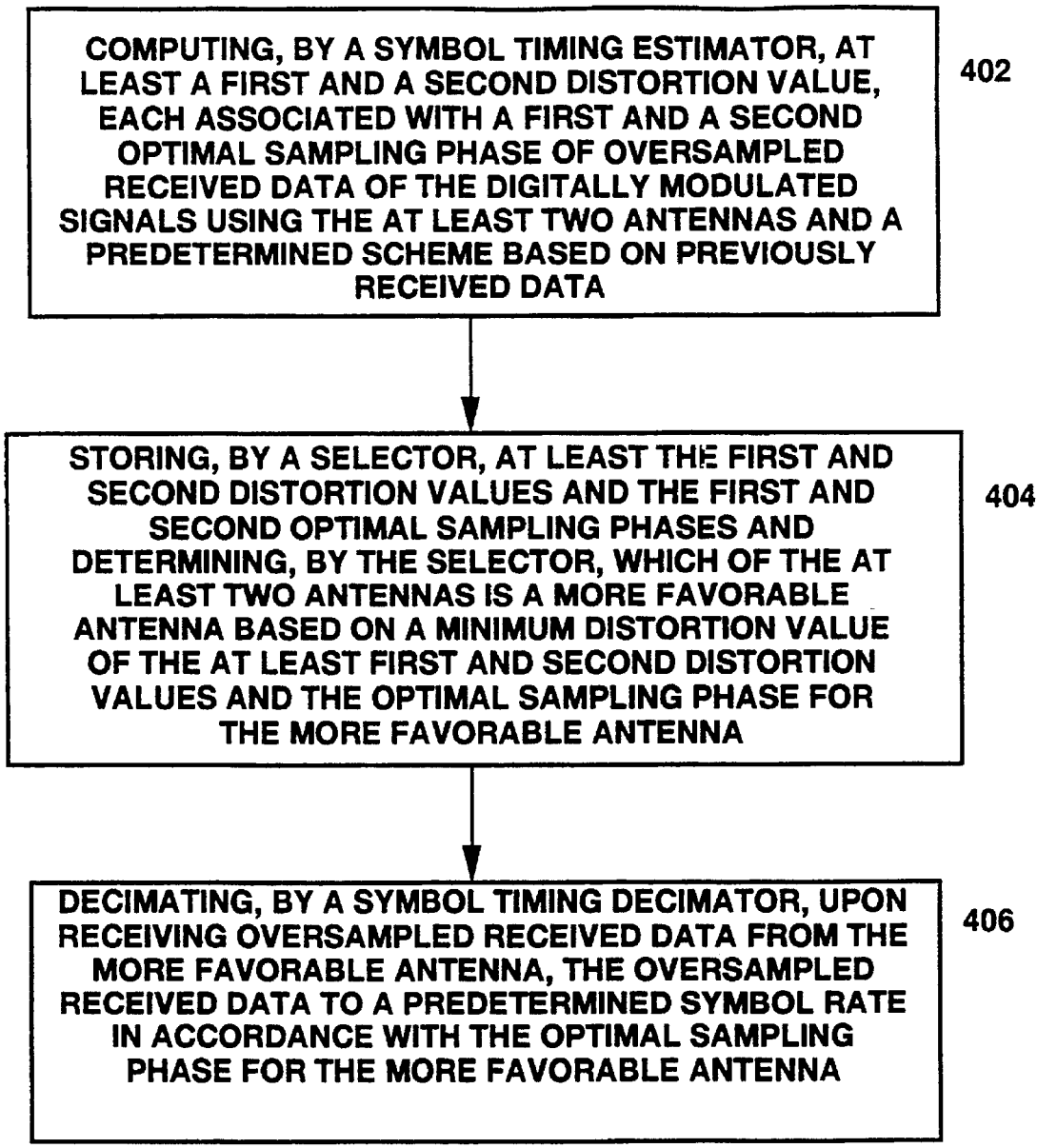
FIG. 4 is a flow chart of the steps for optimizing the implementation of symbol timing estimation in a receiver with at least two antennas receiving digitally modulated signals in accordance with the present invention.

A flow chart for optimizing the implementation of symbol timing estimation in a receiver with at least two antennas receiving digitally modulated signals in accordance with an embodiment of the invention is shown in FIG. 4, numeral 400. The method includes the steps of: A) computing, by a symbol timing estimator, at least a first and a second distortion value, each associated with at least a first and a second optimal sampling phase of oversampled received data of the digitally modulated signals using the at least two antennas and a predetermined scheme based on previously received data (402); B) storing, by a selector, at least the first and second distortion values and the at least first and second optimal sampling phases and determining, by the selector, which of the at least two antennas is a more favorable antenna based on a minimum distortion value of the at least first and second distortion values (404); C) decimating, by a symbol timing decimator, upon receiving oversampled received data from the more favorable antenna, the oversampled received data to a predetermined symbol rate in accordance with the optimal sampling phase for the more favorable antenna (406). The preselected portion of previously received data may include at least a portion of at least one previous time slot.

Where selected, the digitally modulated signals may be transmitted in a time division multiplex system. Also, where selected, the predetermined scheme based on previously received data provides for computation of the optimal sampling phase as a sampling phase having a least distortion in at least a first preselected portion of previously received oversampled data.

The method may include utilizing, by the selector, a plurality of storage registers for receiving at least the first and second distortion values and the at least first and second optimal sampling phases and determining, by at least a first comparator, the minimum distortion value of the at least first and second distortion values, wherein the most favorable antenna and its associated optimal sampling phase are chosen.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A device for optimizing the implementation of symbol timing estimation in a digital receiver receiving digitally modulated signals, comprising:

A) a symbol timing estimator, for computing an expected optimal sampling phase estimate of oversampled received data of the digitally modulated signals using a predetermined scheme based on previously received data, B) storage register, operably coupled to the symbol timing estimator, for storing the expected optimal sampling phase estimate, C) a symbol timing decimator, operably coupled to receive oversampled received data and to the storage register, for decimating the real-time oversampled received data to a predetermined symbol rate in accordance with the expected optimal sampling phase estimate, wherein the digitally modulated signals are transmitted in a time division multiplex system, wherein the previously received data comprises at least a portion of at least one previous time slot.

2. The device of claim 1 wherein the predetermined scheme based on previously received data provides for computation of the optimal sampling phase estimate as a sampling phase having a least distortion in at least a first preselected portion of previously received oversampled data.

3. A device for optimizing the implementation of symbol timing estimation in a receiver with at least two antennas receiving digitally modulated signals (digital receiver), comprising:

A) a symbol timing estimator, for computing at least a first and a second distortion value, each associated with at least a first and a second expected optimal sampling phase estimate of oversampled received data of the digitally modulated signals using the at least two antennas and a predetermined scheme based on previously received data, B) a selector, operably coupled to the symbol timing estimator, for B1) storing at least the first and second distortion values and at least the first and second expected optimal sampling phase estimates and B2) determining which of the at least two antennas is a more favorable antenna based on a minimum distortion value of the at least first and second distortion values, C) a symbol timing decimator, operably coupled to receive oversampled received data from the more favorable antenna and to the selector, for decimating the oversampled received data to a predetermined symbol rate in accordance with the expected optimal sampling phase estimate for the more favorable antenna, wherein the digitally modulated signals are transmitted in a time division multiplex system, wherein the previously received data comprises at least a portion of at least one previous time slot.

4. The device of claim 3 wherein the predetermined scheme based on previously received data provides for computation of the optimal sampling phase estimate as a sampling phase having a least distortion in at least a first preselected portion of previously received oversampled data.

5. The device of claim 3 wherein the selector comprises:

A) a plurality of storage registers, operably coupled to receive at least the first and second distortion values and at least the first and second optimal sampling phase estimates;

B) at least a first comparator, operably coupled to the storage registers, for determining the minimum distortion value of the at least first and second distortion values, wherein the most favorable antenna and its associated optimal sampling phase estimate are chosen.

6. A method for optimizing the implementation of symbol timing estimation in a digital receiver receiving digitally modulated signals, comprising the steps of:

A) computing, using a symbol timing estimator, an expected optimal sampling phase estimate of oversampled received data of the digitally modulated signals using a predetermined scheme based on previously received data, B) storing the expected optimal sampling phase estimate in a storage register, C) decimating, using a symbol timing decimator, the oversampled received data to a predetermined symbol rate in accordance with the expected optimal sampling phase estimate,.

wherein the digitally modulated signals are transmitted in a time division multiplex system, wherein the previously received data comprises at least a portion of at least one previous time slot.

7. The method of claim 6 further including, in the predetermined scheme based on previously received data, computing the optimal sampling phase estimate as a sampling phase having a least distortion in at least a first preselected portion of previously received oversampled data.

8. A method for optimizing the implementation of symbol timing estimation in a receiver with at least two antennas receiving digitally modulated signals, comprising the steps of:

A) computing, by a symbol timing estimator, at least a first and a second distortion value, each associated with at least a first and a second expected, optimal sampling phase estimate of oversampled received data of the digitally modulated signals using the at least two antennas and a predetermined scheme based on previously received data, B) storing, by a selector, at least the first and second distortion values and the at least first and second expected optimal sampling phase estimates and determining, by the selector, which of the at least two antennas is a more favorable antenna based on a minimum distortion value of the at least first and second distortion values, C) decimating, by a symbol timing decimator, upon receiving oversampled received data from the more favorable antenna, the oversampled received data to a predetermined symbol rate in accordance with the expected optimal sampling phase estimate for the more favorable antenna, wherein the digitally modulated signals are transmitted in a time division multiplex system, wherein the previously received data comprises at least a portion of at least one previous time slot.

9. The method of claim 8 wherein the predetermined scheme based on previously received data provides for computation of the optimal sampling phase estimate as a sampling phase having a least distortion in at least a first preselected portion of previously received oversampled data.

10. The method of claim 8 including:

A) utilizing, by the selector, a plurality of storage registers for receiving at least the first and second distortion values and the at least first and second optimal sampling phase estimates;

B) determining, by at least a first comparator, the minimum distortion value of the at least first and second distortion values, wherein the most favorable antenna and its associated optimal sampling phase estimate are chosen.

* * * * *